(12) United States Patent
Kirby et al.

(10) Patent No.: US 6,839,563 B1
(45) Date of Patent: Jan. 4, 2005

(54) SIGNAL TRANSMISSION CIRCUIT FOR PROBE

(75) Inventors: Steve Kirby, Bristol (GB); Jonathan P Fuge, Stonehouse (GB)

(73) Assignee: Renishaw, PLC, Gloucestershire (GB)

( * ) Notice: Subject to any disclaimer, the term of this patent is extended or adjusted under 35 U.S.C. 154(b) by 0 days.

(21) Appl. No.: 09/402,623

(22) PCT Filed: Feb. 11, 1999

(86) PCT No.: PCT/GB99/00270
§ 371 (c)(1),
(2), (4) Date: Oct. 7, 1999

(87) PCT Pub. No.: WO99/41856
PCT Pub. Date: Aug. 19, 1999

(30) Foreign Application Priority Data

Feb. 11, 1998 (GB) .............................. 9802767

(51) Int. Cl.[7] .................................. H04B 7/00
(52) U.S. Cl. ................... 455/500; 455/39; 455/67.1; 455/67.7; 455/134; 455/135; 340/679; 33/503; 33/558
(58) Field of Search ................... 450/40, 39, 67.1, 450/67.7, 500; 340/679, 680, 870.41; 455/134, 132, 133; 33/503, 558

(56) References Cited

U.S. PATENT DOCUMENTS

| | | | |
|---|---|---|---|
| 4,823,398 A | * | 4/1989 | Hashimoto .................. 708/446 |
| 5,150,529 A | | 9/1992 | Collingwood ................. 33/503 |
| 5,272,817 A | | 12/1993 | Gonzalez ....................... 33/561 |
| 5,279,042 A | * | 1/1994 | Gonzalez et al. ............. 33/561 |
| 5,949,352 A | * | 9/1999 | Ferarri .................... 340/870.16 |

FOREIGN PATENT DOCUMENTS

| | | |
|---|---|---|
| EP | 0 337 670 A2 | 10/1989 |
| EP | 0 337 671 A2 | 10/1989 |
| EP | 0 501 681 A1 | 9/1992 |
| FR | 2 567 700 | 1/1986 |
| WO | WO 95/28615 | 10/1995 |

OTHER PUBLICATIONS

Ibrahim, M. M., et al., "Performance Analysis of Optical Receivers with Space Diversity Reception," IEE Proc. Commun., vol. 143, No. 6, December 1996, pp. 369–372.

* cited by examiner

Primary Examiner—William Trost
Assistant Examiner—Danh Le
(74) Attorney, Agent, or Firm—Oliff & Berridge, PLC

(57) ABSTRACT

An optical pulse signal from a machine tool measuring probe is received by a photodiode (28). To reduce interference from xenon strobe beacons, fluorescent lights etc., the pulse signal is processed by an AGC amplifier (30) with low frequency signal cancellation, and the pulses are then detected by a threshold detector (32). The threshold of this detector (32) is variable by a circuit (50), in accordance with the overall amplitude of the signal pulses, in order to provide the best rejection of interference pulses.

12 Claims, 3 Drawing Sheets

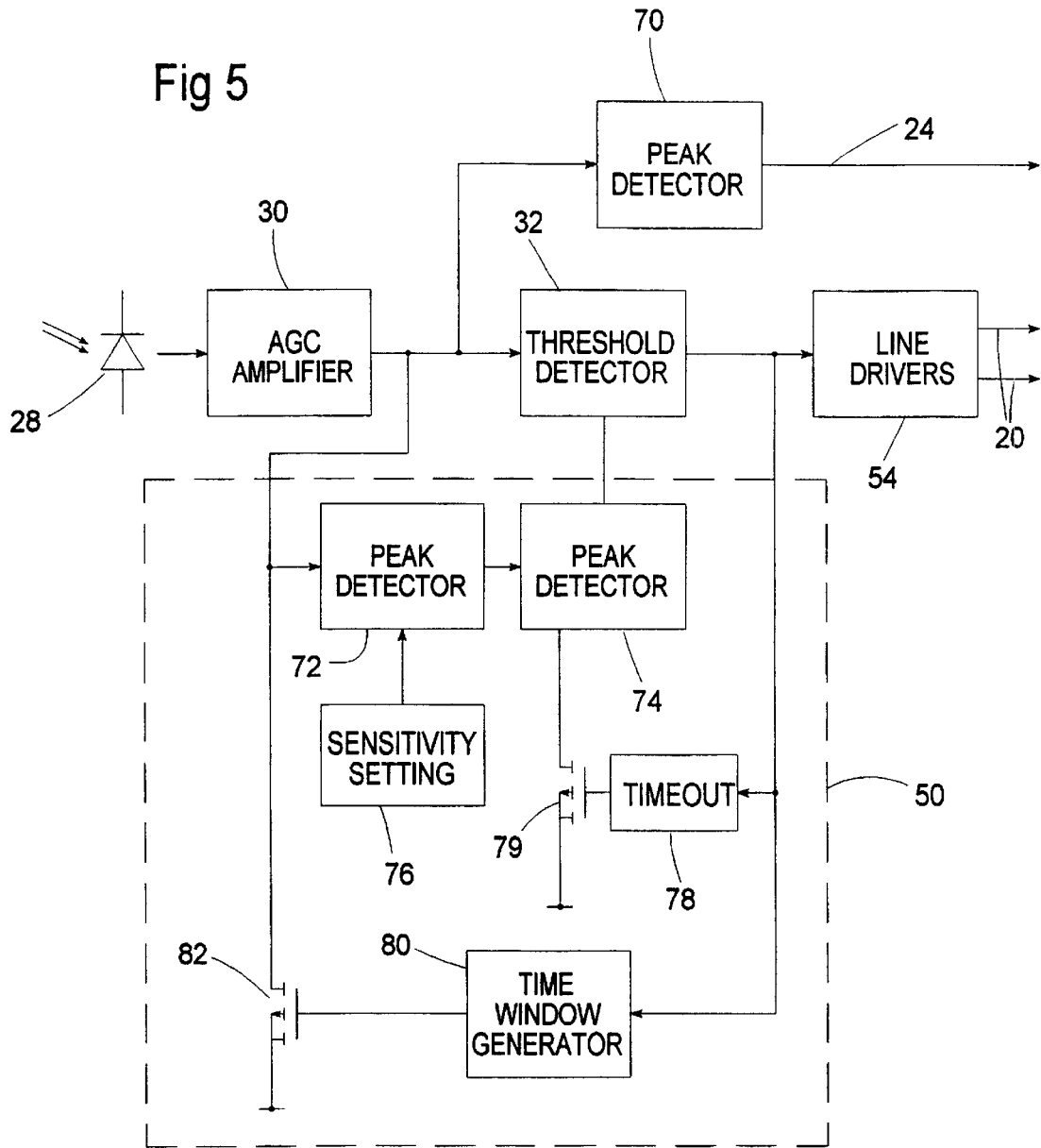

SIGNAL TRANSMISSION CIRCUIT FOR PROBE

This invention relates to a signal transmission circuit. It may be used for the signal generated by a probe of the type used for measurement on position determining machines such as machine tools.

It is known to insert a measuring probe into the movable spindle of a machine tool, so that the spindle may bring the probe into contact with various surfaces of a workpiece to be measured. Since the probe is exchangeable for cutting tools, it is difficult or impossible to hardwire the probe to the subsequent interface circuit which processes the signal and interfaces it to the machine control. Consequently, various wireless signal transmission systems are known. These may, for example, transmit the signals optically or by radio to a receiver mounted on the fixed structure of the machine.

As the spindle-mounted probe moves around the machine, the signal strength received by the receiver varies. Particularly in the case of optical transmission systems, it is known to provide two or more receivers, at different locations on the machine, so that if the signal received by one is weak or non-existent, nevertheless a good signal is received by the other. In such known arrangements, the circuit in the interface simply combines the outputs from the two receivers in parallel.

It is desired to make signal transmission systems which are usable even on large machines, and on machines where there may not always be a line of sight between the probe and one of the receivers. To some extent, this can be achieved by increasing the power output of the probes' transmitter. This increases the range of the signal transmission system. In the case of optical systems, it also allows the use of light which is reflected from various surfaces of the machine even when there is no line of sight. However, in practice, there is a limit to such increases in power, because the probe is battery-operated. If a very high power is emitted, the battery life will be very short. Another possibility, therefore, is to increase the receiver sensitivity.

Problems arise, however, both with single receivers and multiple receivers, if the receivers are made more sensitive so as to extend the range of the signal transmission. The greater sensitivity renders the receivers more susceptible to interference. In the case of optical systems, such interference may be caused by strobe beacons, fluorescent lights, or even other signal transmission systems of probes on nearby machines.

One aspect of the present invention provides a signal transmission circuit for a probe, in which the probe signal is transmitted in the form of pulses, and comprising a circuit for receiving said pulses, wherein the pulse receiving circuit includes a threshold detector which produces an output when a said pulse exceeds a given threshold, said threshold being variable in accordance with the amplitude of the pulses received, and wherein the value of said given threshold decays when the signal level falls below the threshold, with a time constant which is large compared to the pitch of the pulses but small compared to fluctuations in the overall amplitude of the pulses.

A second aspect of the invention provides a signal transmission system for a probe, comprising:
  a transmitter associated with the probe;
  a plurality of receivers for receiving signals transmitted by the transmitter;
  a circuit connected to receive the output signals of said receivers;
  said circuit comparing the signal strengths of the signals from each receiver and selecting an output from one or more of the receivers based on the relative signal strengths thereof.

A preferred embodiment of the invention will now be described by way of example, with reference to the accompanying drawings wherein:

FIG. 5 is a schematic diagram of an alternative receiver to that of FIG. 2.

Figure 1:
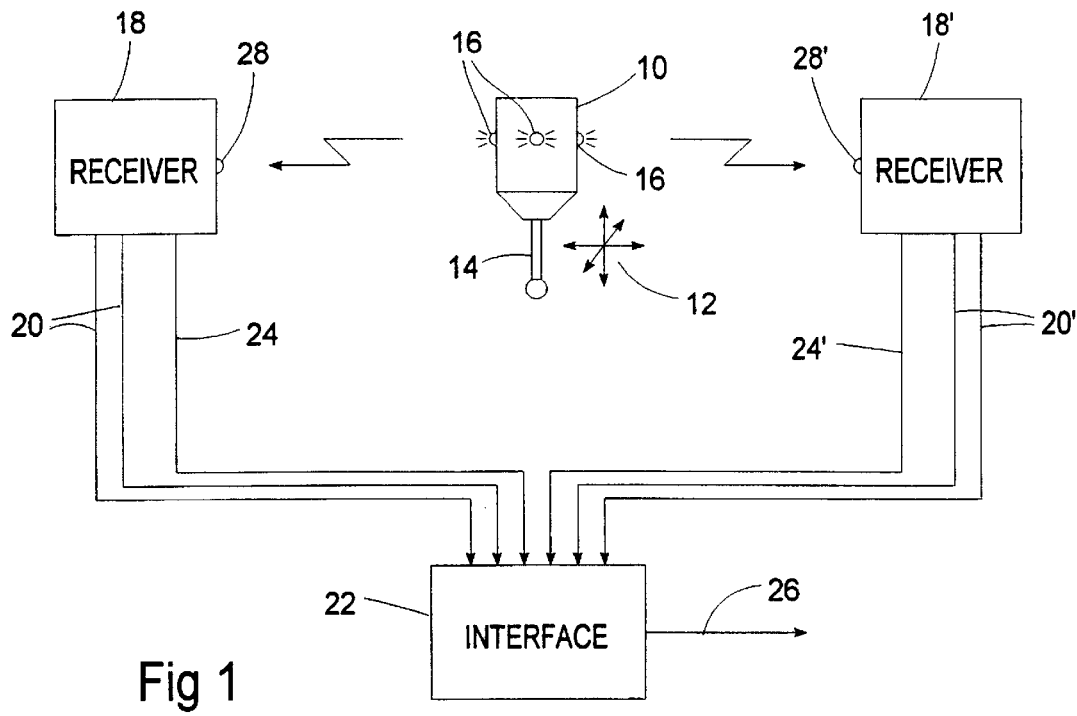
FIG. 1 is an overall schematic diagram of a machine tool probe and a signal transmission system.

FIG. 1 shows a probe 10 which can be mounted in the spindle of a machine tool for movement in X,Y and Z directions (as indicated by arrows 12). The probe is suitably a touch trigger probe with a deflectable stylus 14, which issues a trigger signal when its stylus 14 contacts a workpiece. However, the invention is also useful for probes which output a signal corresponding to the amount of deflection of the stylus 14. The signal is transmitted optically to the machine control from the probe and to this end the probe 10 has a plurality of light emitting diodes 16 (for example, red or infra-red light emitting diodes). The probe is battery-powered, and when switched on it emits a continuous stream of light pulses, onto which the required signals are encoded.

The light pulses are received by photodetectors 28,28' in one or more receiving units (two of which are shown at 18 and 18' in the present example). Each receiver converts the light pulses to two complementary electrical pulse signals, which are sent on lines 20,20' to an interface circuit 22. Each receiver 18,18' also produces a DC level on a line 24,24', which indicates the amplitude or signal strength of the light pulses received. The DC level may be a voltage level or a current level. This DC signal is also taken to the interface 22.

After processing the signals, the interface 22 produces an output signal on a line 26, which is sent to the machine control. In the case of a touch trigger probe, the line 26 carries a trigger signal indicating that the stylus 14 has touched a workpiece, and the machine control uses this to halt the movement of the probe and to initiate a determination of the probe's position in space (and hence of the position of the workpiece surface). Alternatively, the interface 22 can output a signal corresponding to the amount of deflection of the stylus 14.

As the probe 10 moves around the machine, the signal level received by a given one of the receivers 18,18' will vary, depending on the relative position of the probe and the receiver. However, as in previously known arrangements, the intention is that, at any given time, at least one of the receivers 18 will receive a useable signal.

The range of the signal transmission system is improved (compared to previously known arrangements) partly by increasing the power output of the diodes 16, but mainly by increasing the sensitivity of the receivers 18,18'. Naturally, however, this also makes them more sensitive to unwanted interference, such as from xenon strobe beacons, fluorescent lights and the signal transmission systems of probes on nearby machines. Arrangements which enable one or more of these problems to be reduced or overcome will now be described.

Figure 2:
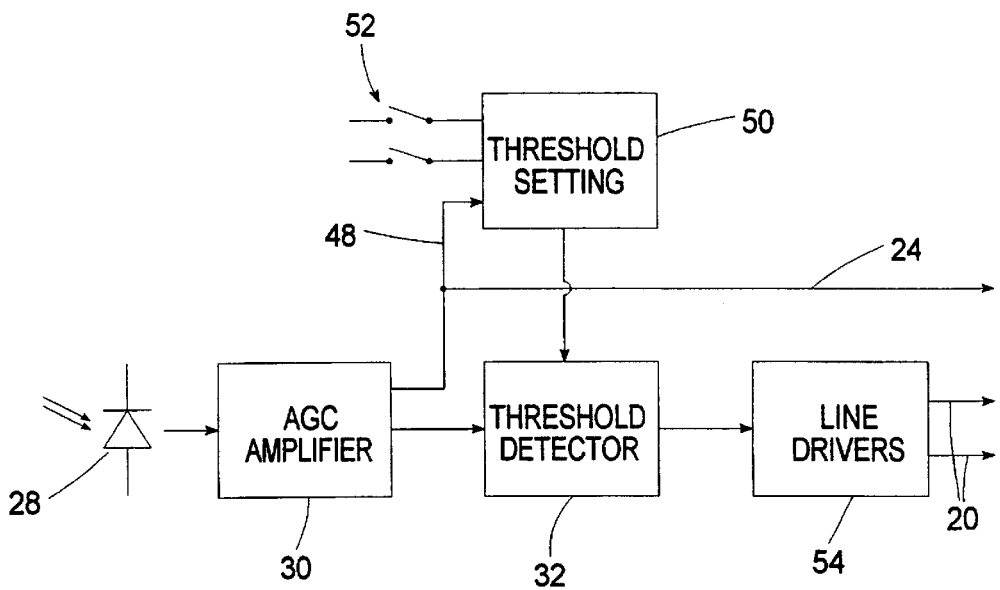
FIG. 2 is a schematic circuit diagram of a receiver shown in FIG. 1.

FIG. 2 shows schematically the circuit of one of the receivers 18. The other receiver 18' is similar. The infra-red light pulses are received by a photodiode 28, and processed by an amplifier 30. This includes an automatic gain control (AGC) and has a high pass characteristic. The amplifier thus provides low frequency signal cancellation, to remove the effects of sunlight, low frequency lighting, and other background light. It also produces an automatic gain control output on a line 48, which is indicative of the amplitude of the incoming pulses. This output also provides the DC level on the line 24 to the interface 22.

Next, the variable amplitude pulse signals which are output from the amplifier 30 are taken to a threshold detector 32. The effect of this is explained in FIGS. 3A and 3B.

Figure 3A:
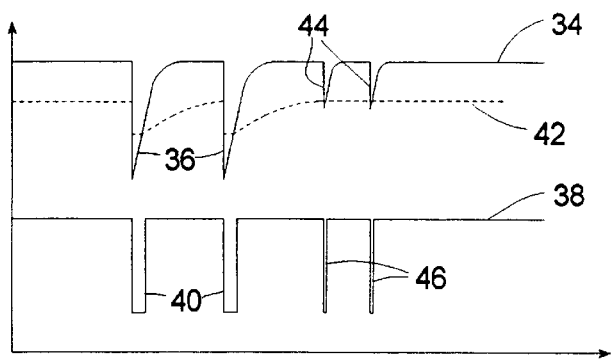
FIGS. 3A and 3B are graphs of signals, for explaining the operation of the receiver circuit of FIG. 2.

In FIG. 3A, curve 34 indicates the output of the amplifier 30, and curve 38 represents the output of the threshold detector 32. The curve 34 includes pulses 36 which are the required signal transmitted from the probe 10. Each of these pulses 36, as can be seen, has a trailing tail, and the effect of the threshold detector 32 is to square the pulses up, as seen at 40 in the curve 38. A broken line 42 in FIG. 3A indicates the variable nature of the threshold of a previously known, commercially available device. In this known device, the threshold rises stepwise on the leading edge of each pulse 36. (The rise is in the negative direction since the pulses are negative-going.) This prevents the output pulses 40 from becoming too wide as a result of the tail of the pulse 36. However, the threshold in this known device falls immediately after each pulse 36, with a relatively short time constant, ready for the next pulse 36. (The fall in the threshold is in the positive direction in FIG. 3A.) The threshold 42 of the known device in FIG. 3A has a certain minimum level, i.e. a certain minimum distance in the negative direction from the base line of the curve 34.

It was mentioned above that the sensitivity of the receiver 18 has been increased, compared to the known, commercially available devices. Of course, one result of this is that it is more susceptible to interference. This can be seen in FIG. 3A, where interference pulses are shown at 44. In the previously known device, these interference pulses would be quite small, but in FIG. 3A they are of a significant size because of the increased sensitivity. As a result, the interference pulses 44 can exceed (in the negative-going direction) the threshold level 42. This results in spurious, error pulses 46 in the output curve 38.

Figure 3B:
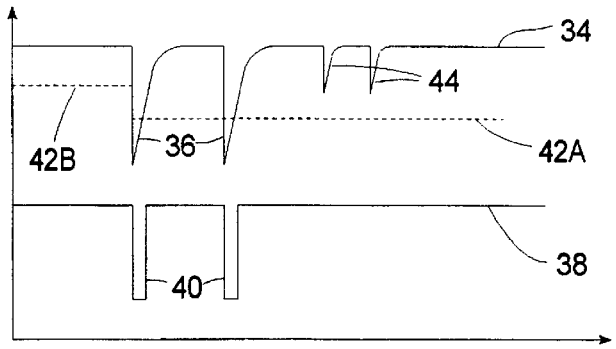

To overcome this problem, the known device is modified as shown in FIG. 3B. Here, the threshold is indicated by a broken line 42A. As in FIG. 3A, it rises stepwise (in the negative direction) on receipt of the first pulse 36. However, it decays with a significantly longer time constant than the threshold 42 in FIG. 3A. Consequently, as long as other pulses 36 continue to be received from the probe 10, the threshold 42A exceeds the interference pulses 44 (in the negative direction) and no error pulses 46 appear in the output 38.

In FIG. 3B, it might appear as if the threshold 42A has a constant level after the first pulse 36. However, it does decay gradually, with a relatively long time constant compared to the time between the pulses 36. This time constant is still chosen to be short compared with the time taken for the probe 10 to move from one side of the machine to the other (i.e. closer to one receiver 18 and further away from the other). Thus, as the probe moves away from the corresponding receiver 18, the threshold 42A falls (i.e. becomes more positive). This ensures that the signal pulses 36 (which are of course now reduced in amplitude) continue to exceed the threshold and produce output pulses 40.

FIG. 2 shows the remainder of the circuitry for producing this effect. The threshold 42A is set in a threshold setting circuit 50, based upon the automatic gain control output 48 received from the amplifier 30. The circuit 50 also receives inputs from preset switches 52. These switches 52 enable the setting of the minimum level of the threshold 42A in the absence of the input pulses 36 (i.e. the level shown at 42B in FIG. 3B). Setting these presets is undertaken for each machine tool installation, depending on the level of interference experienced, in order to ensure that the threshold detector 32 has the greatest possible sensitivity to the required signal pulses, while not being overly sensitive to interference.

The pulses 40 output from the threshold detector 32 are used to feed line drivers 54. This produces the complementary pulse signals on the lines 20 to the interface 22.

The interface circuit 22 contains circuitry which decodes the pulse signals in order to produce the output 26 representing the probe signal (e.g. a touch trigger signal when the stylus 14 contacts a workpiece). Additionally, however, it also contains the circuitry shown in FIG. 4.

Figure 4:
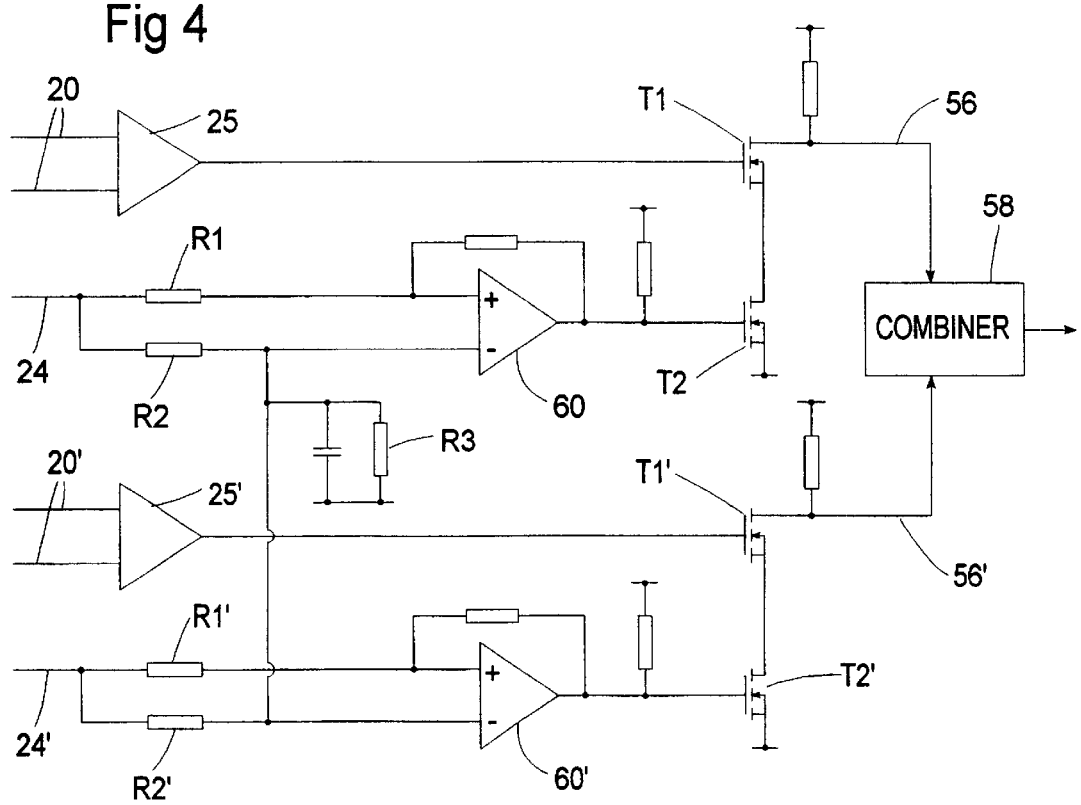
FIG. 4 shows a circuit which forms part of an interface seen in FIG. 1.

FIG. 4 shows the lines 20 and 20' which carry the complementary pulse inputs from the respective receivers 18,18'. The complementary signals from each receiver are combined, e.g. by differential amplifiers 25,25' and are buffered by a corresponding field effect transistor T1,T1'. They then appear on respective lines 56,56' for subsequent processing, during which they are combined together, as illustrated schematically by a combiner circuit 58.

The DC signals 24,24' from the two receivers 18,18' are each taken to the non-inverting input of a respective comparator 60,60' via resistors R1,R1'. Additionally, the two DC levels 24,24' are combined and averaged by respective resistors R2,R2' and a resistor R3. This average value is taken to the inverting input of each of the comparators 60,60'. Thus, when either of the DC signals 24,24' is above the average, its corresponding comparator 60,60' turns on a respective field effect transistor T2,T2'. This enables the corresponding transistor T1,T1' so that the corresponding pulse signals from the lines 20 or 20' are fed to the combiner 58 and the subsequent processing circuitry. Conversely, if a given signal 24,24' is below the average value, the corresponding transistor T2,T2' is turned off, inhibiting the respective transistor T1,T1' so that the pulses on the lines 20 or 20' do not feed through to the combiner 58.

The values of the resistors R2,R2' and R3 are selected such that the average value fed to the inverting inputs of the comparators 60,60' is in fact slightly below the true arithmetical mean of the signals on the lines 24,24'. Thus, if the signals on the lines 24,24' are approximately equal, both transistors T2,T2' will be switched on and the signals on both the lines 20 and the lines 20' will be combined in the combiner 58. If one of the signal levels 24,24' is significantly greater than the other, then only the corresponding pair of the inputs 20,20' will be enabled and the other will be disabled. As a result, the weaker signal (which is more likely to be subject to interference) is disabled and is not used by the subsequently processing circuitry. Furthermore, it will be appreciated that, by setting the average slightly below the strict arithmetical mean, it is ensured that both pairs of signals 20,20' are never disabled at the same time.

The circuit is easily extended to an installation in which three or more receivers 18 are provided. For each receiver 18, there is a corresponding comparator 60 and transistors T1,T2. The inverting inputs of each comparator 60 receive a DC level which results from averaging the DC levels on the lines 24 from all the receivers 18.

FIG. 5 shows a development of the circuit of FIG. 2. It has a number of similar elements, including AGC amplifier 30, threshold detector 32 and line drivers 54, which process the incoming light pulses in a similar manner to the corresponding elements in FIG. 2. This circuit illustrates that the DC level on the line 24 may be provided by a peak detector circuit 70 (the output of which is held and which then decays with a suitable time constant, longer than the pulse spacing) instead of from the AGC amplifier 30.

The threshold setting circuit 50 comprises two further peak detectors 72,74 in series. The output of the peak detector 72 decays with a relatively short time constant (e.g. about 3.3 ms). It provides an output pulse which is long enough to charge the next peak detector 74. The output of the peak detector 74 raises the threshold of the threshold detector 32, and decays with a relatively long time constant (e.g. 103 ms). The effect is similar to that described above with reference to FIG. 3B, except the peak value is taken from the second pulse as described later.

A sensitivity setting circuit 76 may include a programmable voltage divider with switches like the switches 52 in FIG. 2. This circuit 76 varies the minimum level to which the peak detectors 72,74 can discharge, and thus varies the minimum threshold 42B of the threshold detector 32, as previously.

The FIG. 5 threshold setting circuit 50 differs in two significant respects from that of FIG. 2. Firstly, a timeout circuit 78 is reset by each output pulse from the threshold detector 32. Should there be no such output pulse for a given period of time (substantially longer than the pitch of the incoming light signal pulses—e.g. 18 ms) then the timeout circuit 78 quickly discharges the peak detector 74, via an FET 79. This reduces the threshold to its minimum setting, resulting in maximum sensitivity of the threshold detector 32. Thus, if the probe 10 is moved so that there is no longer a direct line of sight to the photodiode 28, maximum sensitivity is restored quickly so that the circuit can respond to reflected light pulses.

The other significant difference is a time window generator 80, also connected to the output of the threshold detector 32. This generates a time window which is slightly longer than the spacing between two adjacent signal pulses, suitably 22 μs. The time window generator 80 controls an electronic switch e.g. in the form of a field effect transistor 82. In the absence of signal pulses, this switch is normally on, and inhibits the input to the peak detector 72.

The purpose of the time window generator 80 is to distinguish between genuine signal pulses and interference pulses, e.g. from xenon beacons or fluorescent lights, which are longer than the chosen time window. When a genuine pulse is followed by a second genuine pulse within the time window, this turns off the transistor 82 briefly, enabling the peak detectors 72,74 so that they react to the second genuine pulse and set the threshold in accordance with its amplitude. Continuing genuine signal pulses ensure that the peak detectors 72,74 continue to be enabled briefly for each successive pulse. In the event of an interference pulse longer than the time window, the transistor 82 remains on so that the peak detectors are disabled. In this way, the interference pulse does not increase the threshold setting, and succeeding signal pulses are correctly detected by the threshold detector 32. Of course, the interference pulse passes through the line drivers 54 to the interface 22, but the pulse decoding circuitry in the interface 22 can recover from the resulting error with the aid of the succeeding signal pulses which are unaffected.

The arrangements described can be modified for use with other wireless signal transmission systems, e.g. radio systems.

What is claimed is:

1. A signal transmission circuit for a probe, in which the probe signal is transmitted in the form of pulses, and comprising a circuit for receiving said pulses, wherein the pulse receiving circuit includes a threshold detector which produces an output when a said pulse exceeds a given threshold, said threshold being variable in accordance with the amplitude of the pulses received, and wherein the value of said given threshold decays when the signal level falls below the threshold, with a time constant which is large compared to the pitch of the pulses but small compared to fluctuations in the overall amplitude of the pulses.

2. A circuit according to claim 1, including a circuit which detects the amplitude of the received pulses, and wherein the threshold of the threshold detector is varied in accordance with an output signal from said amplitude detecting circuit.

3. A circuit according to claim 2, wherein the amplitude detecting circuit is an amplifier for the received pulses, which includes an automatic gain control.

4. A circuit according to claim 2, wherein the amplitude detecting circuit is a peak detector which detects a peak value of a received pulse.

5. A circuit according to claim 2, wherein the amplitude detecting circuit resets the threshold to a minimum setting if no signal pulse is received within a given time period.

6. A circuit according to claim 2, including a circuit for detecting an interference pulse which is longer than a signal pulse, and which inhibits the setting of the threshold if an interference pulse is detected.

7. A circuit according to claim 1, including an amplifier for the received pulses, which includes an automatic gain control.

8. A circuit according to claim 1, including an amplifier for the received pulses, which provides low frequency signal cancellation.

9. A circuit according to claim 1, including a circuit for presetting the minimum level of the threshold.

10. A signal transmission system for a probe, comprising:
a transmitter associated with the probe;
a plurality of receivers for receiving signals transmitted by the transmitter;
a circuit connected to receive output signals of said receivers;
said circuit comparing signal strengths of the signals from each receiver and selecting an output from one or more of the receivers when a signal strength of that output exceeds a certain level, the circuit also including a circuit for combining and averaging the receiver signal strengths, and for selecting an output signal when the corresponding signal strength for that output signal exceeds the average.

11. A system according to claim 10, wherein the average value used by said circuit is below the true arithmetical mean of the receiver output signals, so that more than one signal is selected if the signals are approximately equal.

12. A system according to claim 10, wherein the circuit includes a threshold detector which produces an output when a pulse exceeds a given threshold, said threshold being variable in accordance with the amplitude of the pulses received, and wherein the value of said given threshold decays when the signal level falls below the threshold, with a time constant which is large compared to the pitch of the pulses but small compared to fluctuations in the overall amplitude of the pulses.

* * * * *